(No Model.)
J. H. GUILEY & J. E. WRIGHT.
WRENCH.
No. 482,245. Patented Sept. 6, 1892.
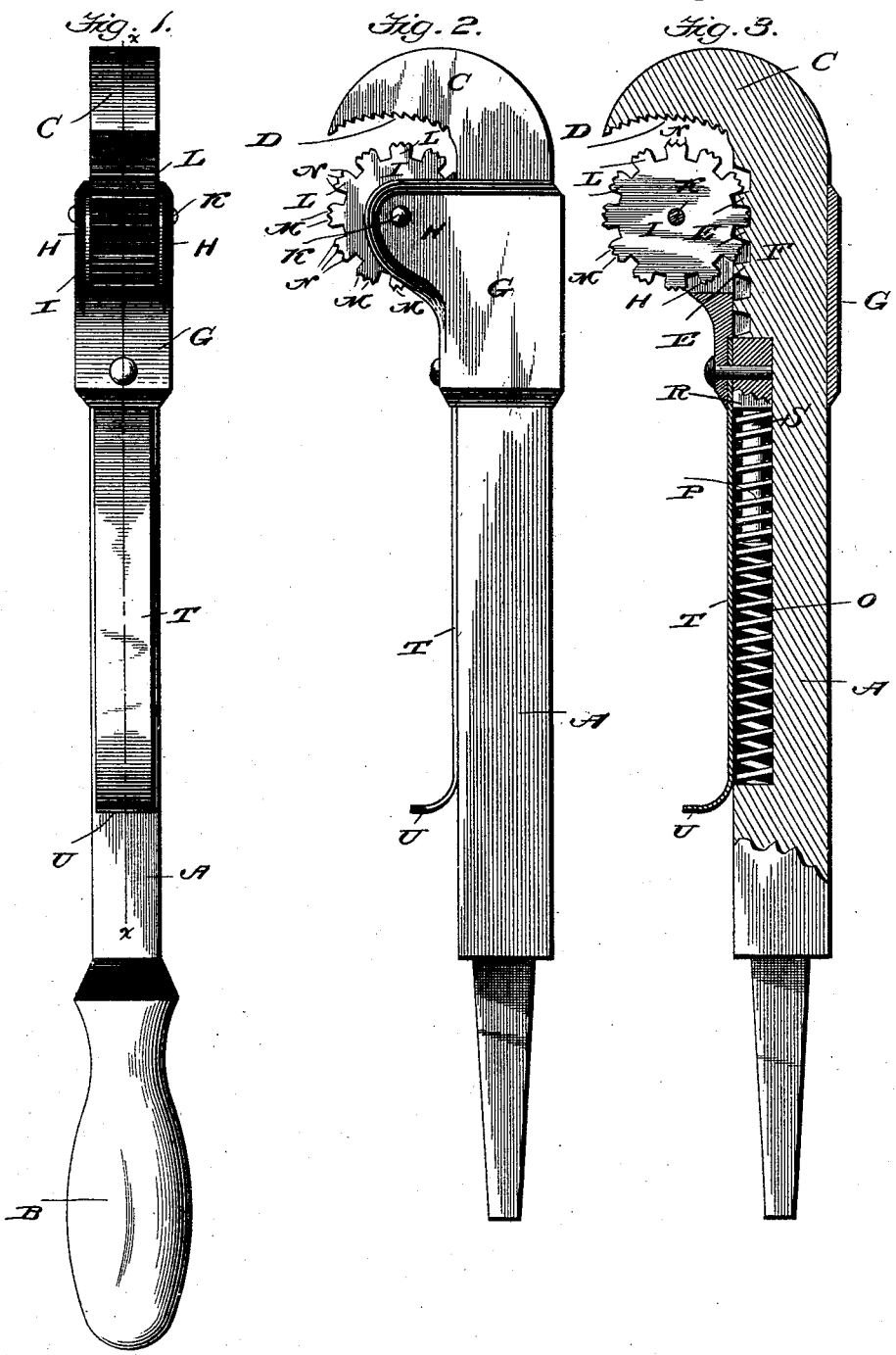

UNITED STATES PATENT OFFICE.

JACOB H. GUILEY AND JAMES E. WRIGHT, OF SAGINAW, MICHIGAN.

WRENCH.

SPECIFICATION forming part of Letters Patent No. 482,245, dated September 6, 1892.

Application filed April 7, 1892. Serial No. 428,109. (No model.)

*To all whom it may concern:*

Be it known that we, JACOB H. GUILEY and JAMES E. WRIGHT, citizens of the United States, residing at Saginaw, in the county of Saginaw and State of Michigan, have invented certain new and useful Improvements in Pipe-Wrenches; and we do hereby declare the following to be a full, clear, and exact description of the invention, such as will enable others skilled in the art to which it appertains to make and use the same.

Our invention relates to improvements in pipe-wrenches, and the object is to provide a simple, strong, and easily-manipulated wrench.

With these ends in view, our improved wrench consists of a bar provided at one end with a suitable handle and at its other end with a rigid jaw, and provided with rack-teeth, a slidable sleeve fitted on the shank or bar to move freely thereon, a gripping-wheel journaled in the sleeve and having its periphery provided with teeth which mesh directly with the teeth of the shank, so as to turn the gripping-wheel axially when the sleeve is moved, and a tension-spring acting to normally force the sleeve and wheel toward the rigid jaw.

Our invention further consists of the peculiar construction and arrangement of parts, as will be hereinafter fully pointed out and claimed.

In the accompanying drawings, Figure 1 is a front elevation of our improved wrench. Fig. 2 is a side elevation of the same, and Fig. 3 is a longitudinal sectional view on the line $x$ $x$ of Fig. 1.

Like letters of reference denote corresponding parts in the several figures of the drawings, referring to which—

A designates the bar or shank of our improved wrench, which is provided at one end with a handle B and at its other end with an integral jaw C, the inner face D of which is curved somewhat and serrated or roughened, as is usual. The inner face of the bar or shank A is provided with a series of transverse parallel ribs or projections E, which form the teeth of a rack F, extending from the jaw C toward the handle B for a suitable distance, and below the teeth E the shank or bar is provided with a socket or recess for the reception of a spring. A sliding sleeve G is fitted around the shank or bar A, and at one end the sides of said sleeve are extended to form flanges H, which serve as bearings for the shaft K of a gripping-wheel I, which is mounted to turn freely in its bearings in the slidable sleeve G. The gripping-wheel I is provided on its periphery with a series of teeth L, which are adapted to engage directly with the teeth E of the rack on the bar A to effect the axial rotation of the wheel when the sleeve is moved. The outer face of each of the teeth L is provided with two or more parallel grooves M, which form the narrow biting-edges N.

In the bar or shank A below the rack thereon is formed the longitudinal socket or recess O, in which is arranged a coiled propelling-spring P. A headed pin R is connected in any suitable manner to the sliding sleeve G, and the stem or shank S of said pin extends into one end of the coiled spring P. A flat arm or plate T is also connected to the sliding sleeve G at or near its lower end and said flat arm or plate extends over and covers the socket or recess O and the coiled spring P therein. The rear end of said arm or plate is bent to form a thumb-piece U, by means of which the sliding sleeve G can be moved on the bar A against the tension of the spring.

In using our improved wrench the sliding sleeve G and its attached gripping-wheel are moved longitudinally on the bar A by pulling down on the thumb-piece of the arm or plate T to permit a pipe to be inserted between the said gripping-wheel and the fixed or stationary jaw C. This movement of the sleeve G compresses the spring P, and when the operator releases the arm or plate T the coiled spring P forces the sleeve G and the gripping-wheel carried thereby forward into close contact with the pipe. As the sleeve G moves forward, the wheel I is revolved or rotated on its axis or shaft by reason of the teeth L thereon meshing with the teeth E of the rack on the bar A. The outer faces of the teeth L being roughened, as shown and described, cause the wheel G to take a firm hold on the pipe, and the latter is securely held in place between such wheel and the fixed or stationary jaw.

We are aware that changes in the form and proportion of parts and details of construction of the devices herein shown and described as an embodiment of our invention can be made without departing from the spirit or sacrificing the advantages thereof, and we therefore reserve the right to make such changes as fairly fall within the scope of the same.

Having thus described our invention, what we claim as new, and desire to secure by Letters Patent, is—

1. As an article of manufacture, a pipe-wrench consisting of a bar provided at one end with a fixed jaw and having a rack arranged at one side of said jaw, a slidable sleeve fitted on and adapted to move longitudinally of the bar, and a toothed gripping-wheel carried by said sleeve and having the teeth on its periphery meshing directly with the rack on the bar or shank, substantially as described.

2. A pipe-wrench consisting of a shank or bar provided with a rigid jaw at one end and having a rack arranged at one side of said jaw, a sliding sleeve fitted on the bar and adapted to move longitudinally thereon, and a gripping-wheel carried by said sleeve and provided on its periphery with a series of teeth which mesh directly with the rack on the bar, the outer faces of said teeth being serrated or roughened, substantially as described.

3. In a pipe-wrench, the combination of a shank or bar provided at one end with a stationary jaw and having a rack arranged at one side of said jaw, a sleeve fitted on said bar and provided at one end with extending flanges, a gripping-wheel mounted on a shaft which is journaled in said flanges and having on its periphery a series of teeth which mesh with the rack, a coiled spring arranged in a recess or socket in the bar below the rack thereon, connections between said sliding sleeve and coiled spring, and a face arm or plate attached to the sleeve and arranged over the socket or recess in the bar, substantially as described.

In testimony whereof we affix our signatures in presence of two witnesses.

JACOB H. GUILEY.
JAMES E. WRIGHT.

Witnesses:
E. A. PERKINS,
WM. P. WARREN.